(12) United States Patent
Erickson et al.

(10) Patent No.: US 9,651,945 B1
(45) Date of Patent: May 16, 2017

(54) DYNAMIC MANAGEMENT SYSTEM, METHOD, AND RECORDING MEDIUM FOR COGNITIVE DRONE-SWARMS

(71) Applicant: International Business Machines Corporation, Armonk, NY (US)

(72) Inventors: Thomas David Erickson, Minneapolis, MN (US); Rogerio Schmidt Feris, Hartford, CT (US); Clifford A. Pickover, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/930,806

(22) Filed: Nov. 3, 2015

(51) Int. Cl.
    *G05D 1/00*    (2006.01)
    *B64C 39/02*   (2006.01)
    *G07C 5/00*    (2006.01)

(52) U.S. Cl.
    CPC ......... *G05D 1/0027* (2013.01); *B64C 39/024* (2013.01); *G05D 1/0016* (2013.01); *G07C 5/008* (2013.01); *B64C 2201/126* (2013.01); *B64C 2201/146* (2013.01)

(58) Field of Classification Search
    CPC .................... B64C 2201/141; B64C 2201/143
    USPC ................. 701/2, 3, 4, 14, 15, 116; 244/190
    See application file for complete search history.

(56) References Cited

U.S. PATENT DOCUMENTS

| 5,521,817 A | * | 5/1996 | Burdoin | ............... | G05D 1/0027 244/190 |
| 2015/0370251 A1 | * | 12/2015 | Siegel | .................. | G05D 1/0027 701/2 |

* cited by examiner

*Primary Examiner* — Gertrude Arthur Jeanglaud
(74) *Attorney, Agent, or Firm* — Alexa L. Ashworth, Esq.; McGinn IP Law Group, PLLC

(57) ABSTRACT

A method, system, and recording medium including a mission receiving device configured to receive a mission for the drone-swarm based on a user input, a drone and pattern recruiting device configured to recruit a plurality of drones based on the mission, and a flocking goal device configured to arrange the plurality of drones in the drone-swarm in a pattern to satisfy the mission.

17 Claims, 5 Drawing Sheets

# DYNAMIC MANAGEMENT SYSTEM, METHOD, AND RECORDING MEDIUM FOR COGNITIVE DRONE-SWARMS

BACKGROUND

The present invention relates generally to a drone-swarm, and more particularly, but not by way of limitation, to a system, a method, and a recording medium for dynamic management of cognitive/contextual drone-swarms.

The use of drones, and other forms of unmanned autonomous vehicles (UAVs), is expanding from high-end applications in military and scientific areas to more pedestrian applications in agriculture, delivery, and entertainment.

Conventional techniques merely use drones, whether macro or micro, as solitary vehicles that can carry out photography, video, or other forms of sensing, or that can perform simple actions such as delivering a payload or releasing chemicals. While few techniques have envisioned uses of multiple drones for aerial displays for advertising and entertainment purposes, these conventional techniques involve drones that operate for well-defined periods of time in pre-defined locations with a single use.

Other conventional techniques propose cases that employ multiple drones that have described various means of coordinating the drone formations and avoiding obstacles. However, such techniques do not describe any functionality that could be used to support the cases of uncertain duration of flight or that might change from mission to mission or even within a mission.

That is, the above conventional systems, and other conventional drone-swarm systems are limited in their applications in that they do not consider a technique that enables managing the creation, dynamic maintenance, and termination of drone-swarms.

Thus, there is a technical problem in the conventional systems that the techniques of managing drone-swarms do not enable managing the creation, dynamic maintenance, and termination of drone-swarms. That is, because many of the uses of such swarms require that the drone-swarm dynamically adapt to the user's requirements, local environmental conditions (e.g., local weather), contextual factors (e.g., terrain, traffic conditions), and the collective state of the swarm itself (e.g., distribution of power reserves, distribution of capabilities, distribution of levels of wear and service life), the conventional techniques are unable to provide such a system or method to achieve these exemplary goals.

SUMMARY

In an exemplary embodiment, the present invention can provide a dynamic management system for a drone-swarm, including a mission receiving device configured to receive a mission for the drone-swarm based on a user input, a drone and pattern recruiting device configured to recruit a plurality of drones based on the mission, and a flocking goal device configured to arrange the plurality of drones in the drone-swarm in a pattern to satisfy the mission.

Further, in another exemplary embodiment, the present invention can provide a dynamic management method for a drone-swarm, including receiving a mission for the drone-swarm based on a user input, recruiting a plurality of drones based on the mission, and arranging the plurality of drones in the drone-swarm in a pattern to satisfy the mission.

Even further, in another exemplary embodiment, the present invention can provide a non-transitory computer-readable recording medium recording a dynamic management program for a drone-swarm, the program causing a computer to perform receiving a mission for the drone-swarm based on a user input, recruiting a plurality of drones based on the mission, and arranging the plurality of drones in the drone-swarm in a pattern to satisfy the mission.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as in the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention. That is, although various conventional techniques have considered the notion of controlling a group of drones to create patterns, the conventional techniques do not provide a service that provides a contextual drone swapping module (DSM) to maintain configuration (e.g. with drones with limited energy/service life and with different characteristics).

BRIEF DESCRIPTION OF THE DRAWINGS

The exemplary aspects of the invention will be better understood from the following detailed description of the exemplary embodiments of the invention with reference to the drawings.

DETAILED DESCRIPTION

Figure 1:
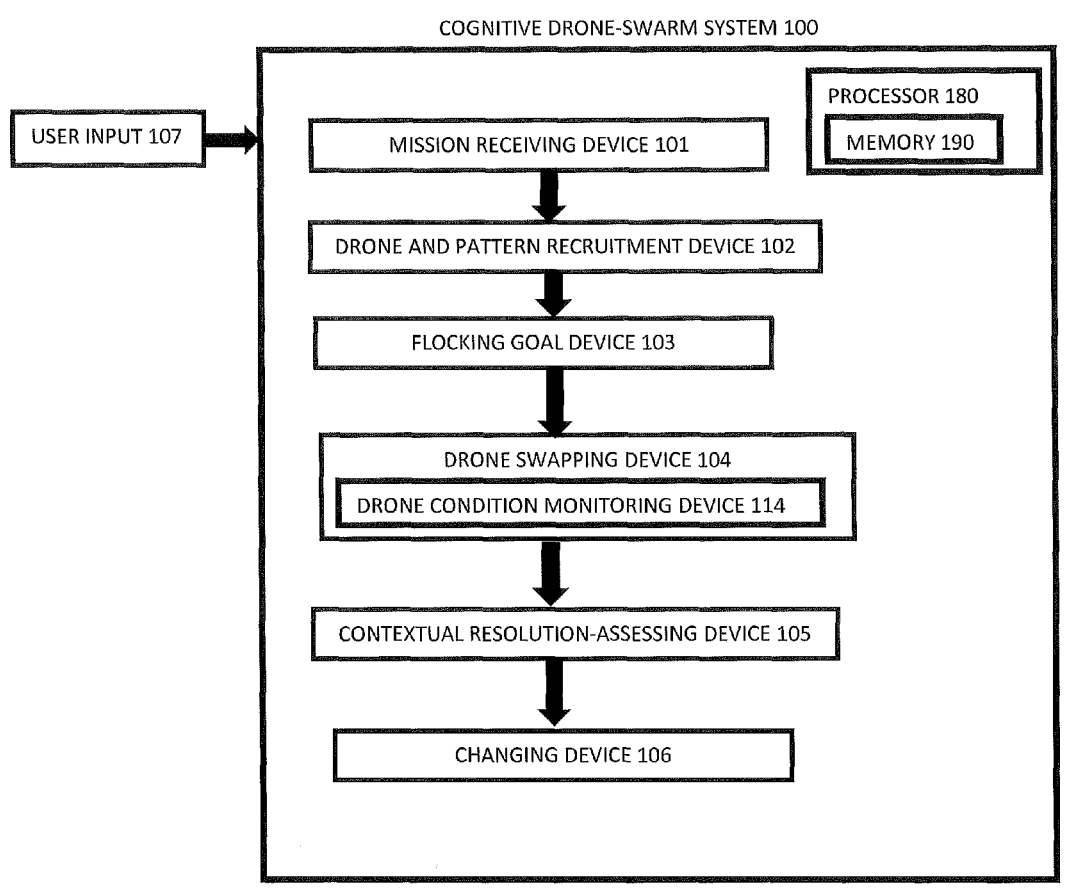
FIG. 1 exemplarily shows a block diagram illustrating a configuration of a dynamic management of a cognitive drone-swarm system 100.

The invention will now be described with reference to FIGS. 1-5, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

With reference now to FIG. 1, the dynamic management of a cognitive drone-swarm system 100 includes a mission receiving device 101, a drone and pattern recruitment device 102, a flocking goal device 103, a drone swapping device 104, a contextual resolution-assessing device 105, and a changing device 106. The drone-swarm system 100 includes a processor 180 and a memory 190, with the memory 190 storing instructions to cause the processor 180 to execute each device of the drone-swarm system 100.

With the use of these various devices, the drone swarm may act in a more sophisticated and useful fashion, and in a cognitive manner while giving the impression of mental abilities and processes related to knowledge, attention, memory, judgment and evaluation, reasoning, and advanced computation. That is, a system is said to be "cognitive" if it possesses macro-scale properties—perception, goal-oriented behavior, learning/memory and action—that characterize systems (i.e. humans) that all agree are cognitive. The drone swarms described in this invention are cognitive in that, in various embodiments, the exhibit the ability to perceive patterns in their environments (e.g., individuals, groups), to adjust their behavior to achieve goals (e.g., forming and maintaining an 'umbrella' or other functional pattern), learn from experience (e.g., adjust their behavior in response to prior experience), and to carry out action (e.g., implement the goal in the context of a mission).

Figure 3:
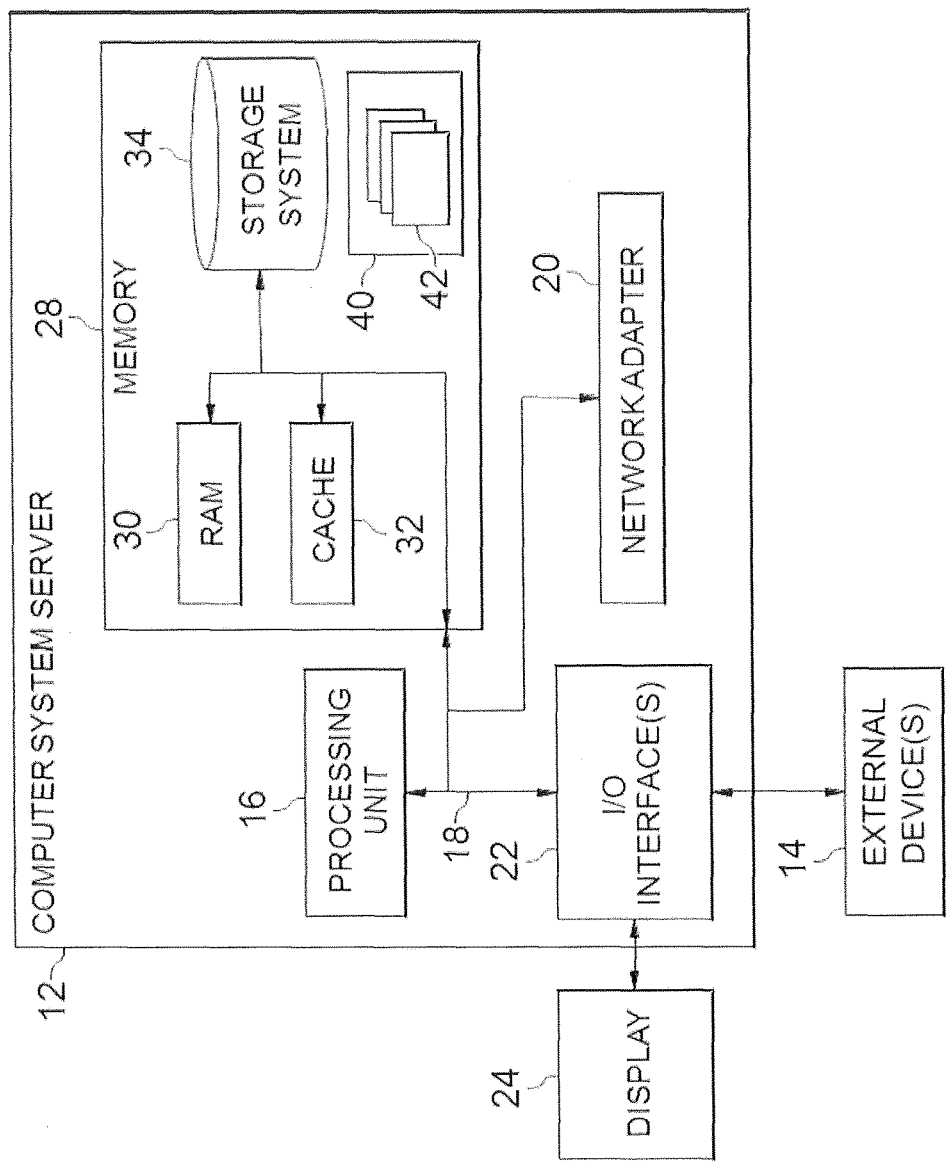
FIG. 3 depicts a cloud computing node according to an embodiment of the present invention.
Figure 4:
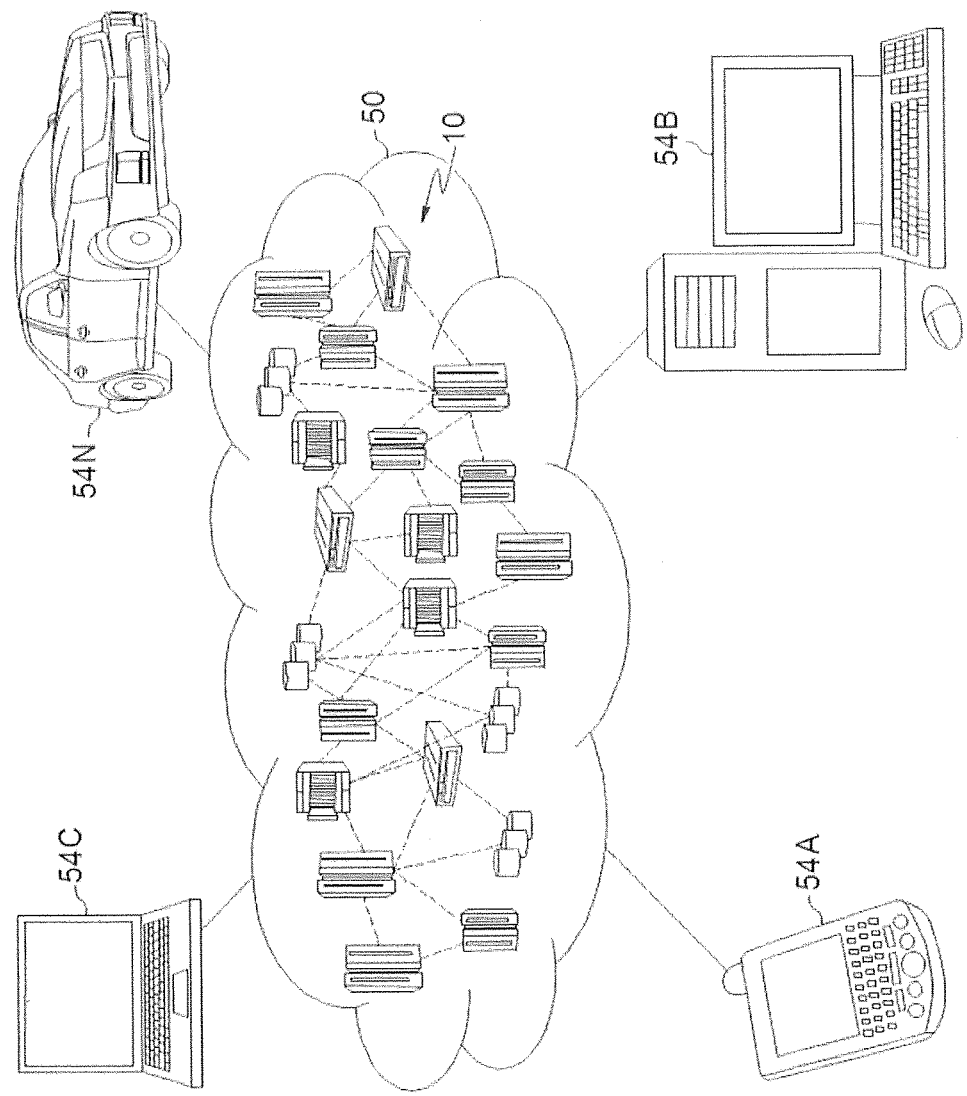
FIG. 4 depicts a cloud computing environment according to another embodiment of the present invention.
Figure 5:
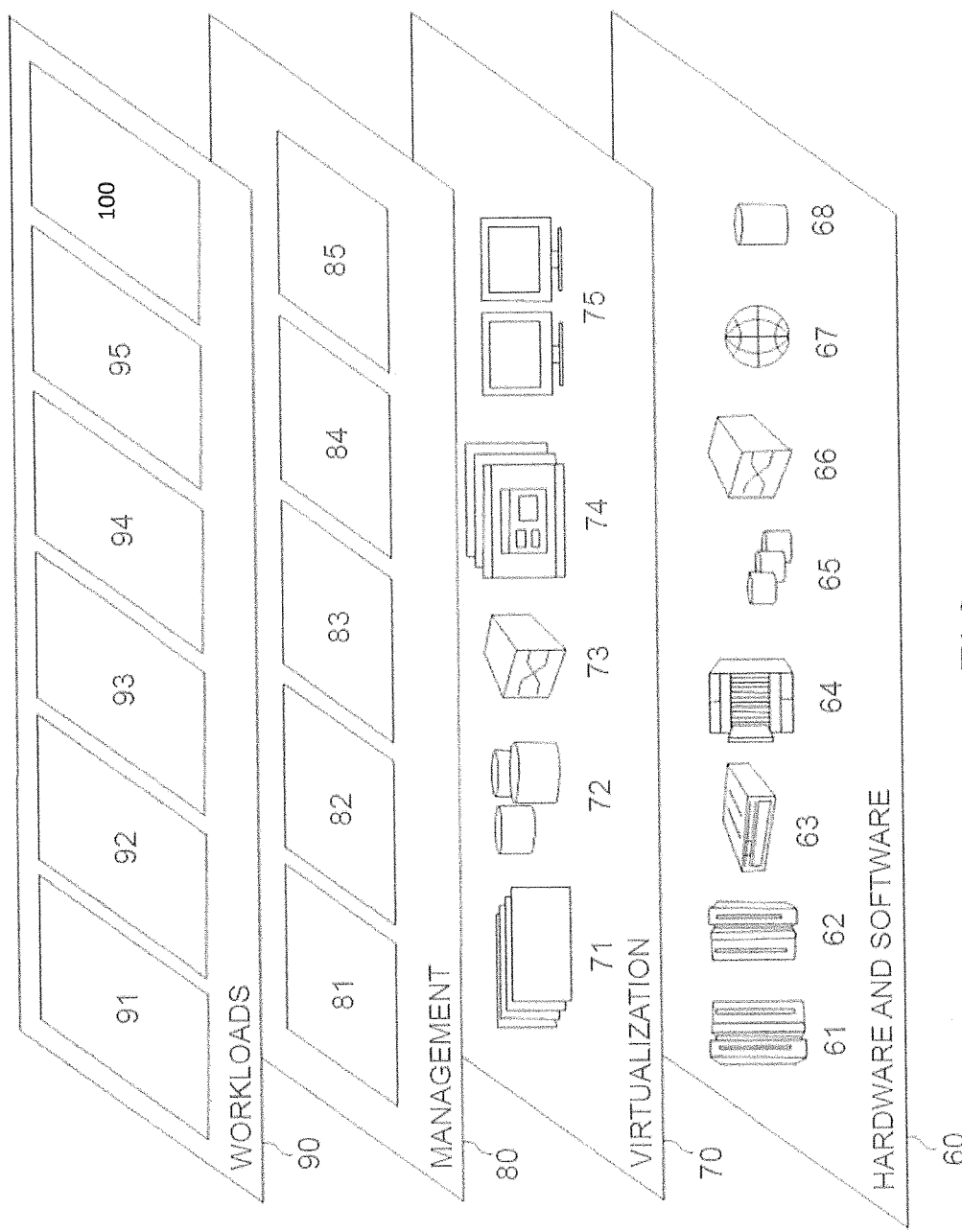
FIG. 5 depicts abstraction model layers according to an embodiment of the present invention.

Although as shown in FIGS. 3-5 and as described later, the computer system/server 12 is exemplarily shown in cloud computing node 10 as a general-purpose computing device which may execute in a layer of the drone-swarm system 100 (FIG. 5), it is noted that the present invention can be implemented outside of the cloud environment.

The mission receiving device 101 of the drone-swarm system 100 receives a user input 107 requesting drones for a specific mission based on the user input 107. In this context, the mission receiving device 101 receives the activity that the user would like the drones to perforin via the user input 107.

For example, missions received by the mission receiving device 101 may include, and are not limited to, drone-swarms that provide parasols for humans and livestock, an umbrella, a "Cone of privacy" to provide shielding from visual surveillance, electro-magnetic eavesdropping, etc., a display screen for people who are walking, or in a location without a fixed screen, window shades that can, for instance, migrate with the sun, a warming cloak or other forms of clothing, a mobile fence or lane for crowd control in a public event, or for guiding participants in public sporting events (e.g., a lane for runners in a 10K event), emergency shelters/coverings for lost or stranded travelers, people in severe weather situations, etc.

The drone and pattern recruitment device 102 receives the mission from the mission receiving device 101 and recruits drones from a "hive" (i.e., drone storage area as a warehouse, etc.) in order to satisfy the mission.

"Hives" can include a source of drones that can print or otherwise manufacture drones on demand, or that simply store drones produced elsewhere ensure that flocks of drones are locally available when a user input 107 is received by the mission receiving device 101.

That is, the drone and pattern recruitment device 102 selectively selects which drones from the hive can complete the mission (i.e., multiple models of drones may be available at each hive in which each can provide a different use for a particular mission).

The drone and pattern recruiting device 102 can also recruit the plurality of drones from a nearby drone-swarm of a different user. The drone and pattern recruiting device 102 recruits the plurality of drones which have different drone features (i.e., different physical features, for example, and not limited to, propeller size, aerodynamics, actual size, etc.) based on requirements of the mission The flocking goal device 103 receives information about which drones have been deployed from the drone and pattern recruitment device 102 and arranges the drones in a drone-swarm in a manner to satisfy the mission. In other words, the flocking goal device 103 controls the drones to assemble as the drone-swarm (i.e., a flock) to satisfy the user input 107.

For example, if the user input 107 requires a mission for an umbrella, the flocking goal device 103 will arrange the drones of the drone-swarm in a manner to form an umbrella over the user.

Even further, for example, if the user input 107 requires a traffic control function, the flocking goal device 103 will control the drones of the drone-swarm to provide the traffic control function.

In other words, the flocking goal device 103 creates the drone-swarm in a specific pattern to satisfy the mission corresponding to the user input 107.

Thus, the flocking goal device 103 includes a pattern specification such that the flocking goal device specifies a configuration of multiple drones (e.g., to form a parasol, an umbrella, a warming cloak, a screen, a 3D model, etc.).

It should be noted that for implementation, the flocking goal device 103 may include a "cost" function so as to assess a cost for a particular configuration to be provided for a particular duration, and collecting payment and a delivery function to manage the delivery of the configuration. For example, if the specific formation requires 10,000 drones, the formation would cost more than a formation that requires 10 drones and such may be communicated to the user/requester.

Further, although the flocking goal device 103 includes a list of pre-programmed patterns for predictable missions of the user input 107, optionally, a user can develop a new configuration(s) that makes use of the capabilities of drones, and can instruct the flocking goal device 103 to deploy the drones in a drone-swarm to satisfy the new configuration.

In an exemplary embodiment, the flock-based control of a number of unmanned aerial vehicles (UAVs) may make use of UAVs with processors executing a local control module and memory accessible by the processor for use by the local control module. The flocking goal device 103 can include a ground station system with a processor executing the flocking goal device 103 and with memory storing different flight plans for each of the UAVs.

If desired, the flight plans may be stored on the UAVs, and, during flight operations, each of the local control modules may optionally independently control the corresponding UAV to execute its flight plan without ongoing control from the flocking goal device 103. The flocking goal device 103 may be operable to initiate flight operations by concurrently triggering initiation of the flight plans by the multiple UAVs. If desired, the local control modules may monitor front and back and communication channels and, when a channel is lost, operate the UAV in a safe mode.

The drone swapping device 104 monitors the drone-swarm as it is deployed and swaps out individual drones to maintain the configuration of the drone-swarm. That is, the drone swapping device includes a drone swapping module (DSM) (i.e., drone condition monitoring device 114) to maintain the configuration of the drone-swarm based on a drone condition. A drone condition can include, and is not limited to, battery life, service life, drone features such as propulsion system features that enable a drone to maintain a pattern in the face of forecast strong winds, a stronger engine, better aerodynamics, better cameras to aid in positioning in a swarm, upgraded navigational software etc. This will give a broader reading of "drone condition" Thus, for example, a specific drone may be low on battery life and the drone swapping device 104 will instruct the drone-swam system to send a new drone with full battery life to replace the drone in the drone-swarm with low battery life so as to maintain the formation set by the flocking goal device 103. Or, the drone swapping device 104 can instruct a drone to be swapped out based on a functionality of the drone and the specific mission to be accomplished. For example, heavier rain may need a different drone (or different configuration) to form an umbrella than the drone for light rain. The DSM may recruit drones from more than one service or owner. Instead of battery life, another criteria could be monitored regarding the drones ability to fulfill the mission (i.e., service life, drone availability due to external factors such as hindrance by other users or persons, etc.)

The drone swapping device 104 further includes a "termination" function for managing the termination of the service, the repatriation of drones to their "hive", and collection of information regarding their quality of function for assessment of the service and improvement of configuration patterns in the future.

The contextual resolution-assessing device 105 monitors the drone-swarm and assess the needed resolution of the pattern to sustain a goal with a risk level "R". For example, the contextual resolution-assessing device 105 may determine if a "100×100 grid of drones" is actually needed for a particular mission such as a sign or a shade, given the wind conditions. That is, the user, of course, may not be aware of the needed resolutions to achieve goals based on context (sunlight, weather, vibrational/pattern instability due to wind), distance D from people on the ground who may benefit from the array, etc.

The "risk level" is a factor associated with the risk of completing the desired mission.

The contextual resolution-assessing device 105 feeds back the pattern to sustain the goal to the drone swapping device 104 in order to either add or subtract drones from the cognitive drone-swarm in order to meet the flocking goal.

The changing device 106 includes a machine learning technique for adaptively changing the configuration or pattern of the cognitive drone-swarm given the flocking goal and mission.

For example, in one exemplary embodiment, drones may be able to recognize gestures of users based on video analytics and change their configuration or motion patterns, allowing interactive aerial displays based on gesture analysis by the changing device 106.

Another exemplary embodiment can include the use of camera-based person detection to automatically adjust the size, distance, and location (vis-à-vis to the user) of a mobile umbrella or sunshade by the changing device 106.

Of course, the above examples of the changing device 106 adaptively changing the configuration of the cognitive drone-swarm are not intended to limit the disclosure. That is, any adaptive change to the drone-swarm can be implemented using the changing device 106.

For example, the changing device 106 can adjust the swarm composition to local conditions, move the swarm in synchrony with 'users', and maintain viability of the swarm over time by adaptively changing the swarm conditions.

The drones can be made of composite drones. Further, each hive can include a plurality of different types of drones that are designed to satisfy a particular mission (i.e., a screen drone for a floating screen, a drone that is waterproof for an umbrella, etc.).

Figure 2:
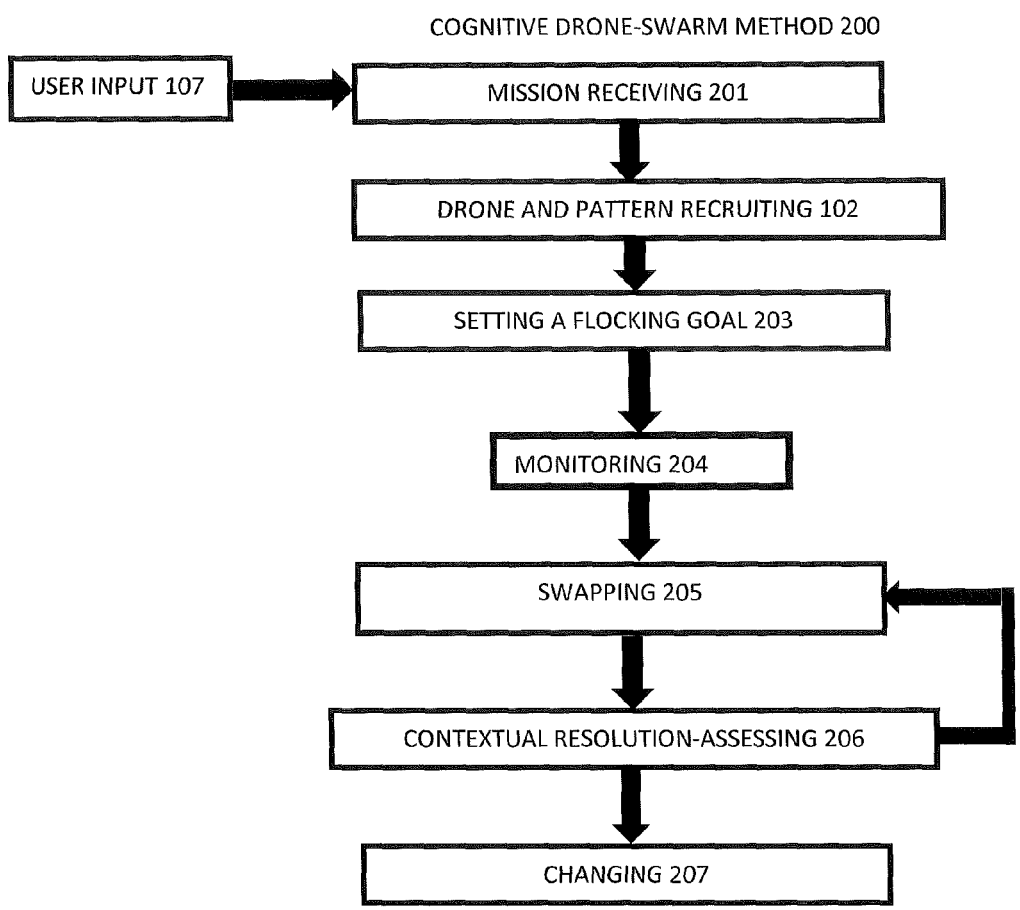
FIG. 2 exemplarily shows a high level flow chart for a dynamic management of a cognitive drone-swarm method 200.

FIG. 2 shows a high level flow chart for a drone-swarm method 200 that has a user input 107 as an input.

Step 201 receives the user input 107 and classifies the user input into a particular mission.

Step 202 receives the mission from Step 201 and recruits drones from the "hive" in order to satisfy the mission.

Step 203 receives which drones have been deployed in Step 202 and arranges the drones in a way to satisfy the mission. In other words, Step 203 controls the drones to assemble as a flock to satisfy the user input 107.

Step 204 monitors the battery life (or other criteria such as remaining service life, etc.) of the flock out drones deployed by Step 203.

Based on the battery life monitored in Step 204, Step 205 swaps drones of the flock out based on the battery life in order to maintain the swam of drones for an extended period of time to satisfy the mission.

Step 206 monitors the drone-swarm and assess the needed resolution of the pattern to sustain a goal with a risk level "R".

Step 206 feeds back the pattern to sustain the goal to Step 205 in order to either add or subtract drones from the cognitive drone-swarm in order to meet the flocking goal.

Step 207 utilizes a machine learning technique for adaptively changing the configuration of the cognitive drone-swarm given the flocking goal.

In view of the foregoing and other problems, disadvantages, and drawbacks of the aforementioned conventional techniques, it is desirable to provide a new and improved drone-swarm system, method, and non-transitory recording medium that, enables users to summon a drone-swarm to satisfy a particular mission.

Thus, the disclosed drone-swarm system, method and non-transitory recording medium improves over existing techniques in at least that there is a need for such a system that enables managing the creation, dynamic maintenance, and termination of drone-swarms. Because many of the uses of such swarms require that they dynamically adapt to their users' requirements (position relative to user), local environmental conditions (local weather), contextual factors (terrain, traffic conditions), and the state of the swarm (power reserves, capabilities, and levels of wear).

Exemplary Hardware Aspects, Using a Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 3, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the drone-swarm system 100 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A dynamic management system for a drone-swarm, comprising:
   a mission receiving device configured to receive a mission for the drone-swarm based on a user input;
   a drone and pattern recruiting device configured to recruit a plurality of drones based on the mission;
   a flocking goal device configured to arrange the plurality of drones in the drone-swarm in a pattern to satisfy the mission; and
   a drone swapping device configured to swap a first drone of the plurality of drones in the drone-swarm with a second drone that is not in the drone-swarm.

2. The system of claim 1, wherein the drone and pattern recruiting device recruits the plurality of drones from a hive, and
   wherein the drone swapping device is further configured to swap the first drone of the plurality of drones in the drone-swarm with a third drone from the hive.

3. The system of claim 1, wherein the drone swapping device includes a drone condition monitoring device configured to monitor a drone condition of each drone of the plurality of drones in the drone-swarm, and
   wherein the drone swapping device swaps the first drone of the plurality of drones in the drone-swarm with the second drone that is not in the drone-swarm based on a drone condition of the first drone.

4. The system of claim 1, further comprising a contextual resolution-assessing device configured to monitor the drone-swarm and assess a needed resolution of the pattern to sustain a goal with a predetermined risk level.

5. The system of claim 1, wherein the drone and pattern recruiting device recruits the plurality of drones from a plurality of hives.

6. The system of claim 1, further comprising a changing device configured to adaptively change the pattern of the drone-swarm based on a condition.

7. The system of claim 1, wherein the drone and pattern recruiting device recruits the plurality of drones which comprise composite drones.

8. The system of claim 1, wherein the drone and pattern recruiting device recruits the plurality of drones which comprise different physical characteristics based on the mission.

9. The system of claim 2, wherein the drone swapping device includes a drone condition monitoring device configured to monitor a drone condition of each drone of the plurality of drones in the drone-swarm, and
   wherein the drone swapping device swaps the first drone of the plurality of drones in the drone-swarm with the second drone that is not in the drone-swarm based on a drone condition of the first drone.

10. A dynamic management method for a drone-swarm, comprising:
    receiving a mission for the drone-swarm based on a user input;
    recruiting a plurality of drones based on the mission;
    arranging the plurality of drones in the drone-swarm in a pattern to satisfy the mission; and
    swapping a first drone of the plurality of drones in the drone-swarm with a second drone that is not in the drone-swarm.

11. The method of claim 10, wherein the swapping includes monitoring a drone condition of each drone of the plurality of drones in the drone-swarm, and
    wherein the swapping swaps the first drone of the plurality of drones in the drone-swarm with the second drone that is not in the drone-swarm based on the drone condition of the first drone.

12. The method of claim 10, further comprising monitoring the drone-swarm and assessing a needed resolution of the pattern to sustain a goal with a predetermined risk level.

13. The method of claim 10, further comprising adaptively changing the pattern of the drone-swarm based on a condition.

14. A non-transitory computer-readable recording medium recording a dynamic management program for a drone-swarm, the program causing a computer to perform:
    receiving a mission for the drone-swarm based on a user input;
    recruiting a plurality of drones based on the mission;
    arranging the plurality of drones in the drone-swarm in a pattern to satisfy the mission; and
    swapping a first drone of the plurality of drones in the drone-swarm with a second drone that is not in the drone-swarm.

15. The non-transitory computer-readable recording medium of claim 14, wherein the swapping includes monitoring a drone condition of each drone of the plurality of drones in the drone-swarm, and
    wherein the swapping swaps the first drone of the plurality of drones in the drone-swarm with the second drone that is not in the drone-swarm based on the drone condition of the first drone.

16. The non-transitory computer-readable recording medium of claim 14, further comprising monitoring the drone-swarm and assessing a needed resolution of the pattern to sustain a goal with a predetermined risk level.

17. The non-transitory computer-readable recording medium of claim 14, further comprising adaptively changing the pattern of the drone-swarm based on a condition.

* * * * *